(12) United States Patent
Haase et al.

(10) Patent No.: US 12,164,164 B2
(45) Date of Patent: Dec. 10, 2024

(54) OPTICAL CONNECTOR AND METHODS OF MODIFYING OPTICAL CONNECTOR

(71) Applicant: 3M INNOVATIVE PROPERTIES COMPANY, St. Paul, MN (US)

(72) Inventors: Michael A. Haase, St. Paul, MN (US); Paul A. Chery, St. Paul, MN (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 12 days.

(21) Appl. No.: 17/637,680

(22) PCT Filed: Sep. 8, 2020

(86) PCT No.: PCT/IB2020/058343
§ 371 (c)(1),
(2) Date: Feb. 23, 2022

(87) PCT Pub. No.: WO2021/048740
PCT Pub. Date: Mar. 18, 2021

(65) Prior Publication Data
US 2022/0291466 A1    Sep. 15, 2022

Related U.S. Application Data

(60) Provisional application No. 62/897,488, filed on Sep. 9, 2019.

(51) Int. Cl.
*G02B 6/44* (2006.01)
*G02B 6/36* (2006.01)
*G02B 6/38* (2006.01)

(52) U.S. Cl.
CPC .......... *G02B 6/4403* (2013.01); *G02B 6/368* (2013.01); *G02B 6/3829* (2013.01)

(58) Field of Classification Search
CPC ..... G02B 6/4403; G02B 6/368; G02B 6/3829
(Continued)

(56) References Cited

U.S. PATENT DOCUMENTS

| 5,373,578 A | 12/1994 | Parker |
| 6,264,375 B1 | 7/2001 | Ohtsuka |

(Continued)

FOREIGN PATENT DOCUMENTS

| WO | WO 2014-055226 | 4/2014 |
| WO | WO 2017-066022 | 4/2017 |

(Continued)

OTHER PUBLICATIONS

"Ferrule, 12F, PRIZM® LightTurn®", USConec, [retrieved from the internet on Apr. 20, 2022], URL <http://www.usconec.com/products/ferrules/prizm-lightturn_ferrule.htm>, 2012, 1 page.

(Continued)

*Primary Examiner* — Jerry M Blevins
(74) *Attorney, Agent, or Firm* — Robert S. Moshrefzadeh

(57) ABSTRACT

A fiber optic ribbon is disclosed and includes a plurality of optical fibers extending along a first axis and arranged along an orthogonal second axis at a pitch P. Each optical fiber includes a core surrounded by a cladding surrounded by a buffer, the buffer has a nominal diameter D0 substantially equal to P. The buffer is stripped between a buffer-end location on the fiber and a free end of the fiber to form a stripped section. The buffer is distorted at the buffer-end location, such that at the buffer-end location, a width W of the buffer in the second axis is less than D0.

15 Claims, 13 Drawing Sheets

(58) Field of Classification Search
USPC .......................................................... 385/114
See application file for complete search history.

(56) References Cited

U.S. PATENT DOCUMENTS

| | | | |
|---|---|---|---|
| 6,478,473 B1 | 11/2002 | Hirao | |
| 2014/0010499 A1 | 1/2014 | Suematsu | |
| 2014/0023332 A1* | 1/2014 | Nishigaki | G02B 6/4403 |
| | | | 83/13 |
| 2015/0309266 A1 | 10/2015 | Childers | |
| 2017/0135765 A1* | 5/2017 | Griffin | G02B 6/0003 |
| 2019/0072705 A1 | 3/2019 | Kaneuchi | |
| 2019/0219772 A1* | 7/2019 | Li | G02B 6/389 |
| 2021/0333480 A1* | 10/2021 | Childers | G02B 6/368 |

FOREIGN PATENT DOCUMENTS

| | | |
|---|---|---|
| WO | WO 2017-066137 | 4/2017 |
| WO | WO 2020-003124 | 1/2020 |
| WO | WO 2020-240346 | 12/2020 |

OTHER PUBLICATIONS

International Search Report for PCT International Application No. PCT/IB2020/058343, mailed on Jan. 15, 2021, 6 pages.

* cited by examiner

404

Providing the fiber optic ribbon 112 including a plurality of optical fibers 116, each optical fiber 116 can include a core 130 surrounded by a cladding 134 surrounded by a buffer 138, each optical fiber 116 can include a free portion 180 where the optical fiber 116 is disconnected from adjacent optical fibers 116 and the free portions 180 can extend along the first axis X and can be arranged along the orthogonal second axis Y, each optical fiber 116 can further include a joined portion 184 where the optical fiber 116 is joined to at least one adjacent optical fiber 116, the joined portions 184 can extend along the first axis X and can be arranged along the second axis Y.

408

Arranging the free portions 180 along the third axis Z while the joined portions 184 remain arranged along the second axis Y and the third axis Z can be orthogonal to each of the first axis X and second axis Y.

412

Stripping at least some of the buffer 138 from at least one free portion 180 while the free portions 180 are arranged along the third axis Z and the joined portions 184 are arranged along the second axis Y.

FIG. 13

OPTICAL CONNECTOR AND METHODS OF MODIFYING OPTICAL CONNECTOR

TECHNICAL FIELD

The provided disclosure relates to optical connectors for connecting sets of optical waveguides such as optical fiber ribbons.

BACKGROUND

Optical fiber connectors can be used to connect optical fibers in a variety of applications including telecommunications networks, local area networks, data center links and internal links in high performance computers. It is advantageous for optical fibers to seat securely in grooves of an optical ferrule, while also not interfering electrically or mechanically with adjacent optical fibers.

SUMMARY

In some aspects, the present disclosure provides a fiber optic ribbon. The fiber optic ribbon can include a plurality of optical fibers extending along a first axis and arranged along an orthogonal second axis at a pitch P. Each optical fiber can include a core surrounded by a cladding surrounded by a buffer, and the buffer can have a nominal diameter D0 substantially equal to P. The buffer can be stripped between a buffer-end location on the fiber and a free end of the fiber to form a stripped section. The buffer can be distorted at the buffer-end location, such that at the buffer-end location, a width W of the buffer in the second axis is less than D0.

In some aspects, the present disclosure provides a method of modifying a fiber optic ribbon. The method can include providing the fiber optic ribbon including a plurality of optical fibers, each optical fiber including a core surrounded by a cladding surrounded by a buffer, each optical fiber including a fiber free portion where the optical fiber is disconnected from adjacent optical fibers and the fiber free portions extend along a first axis and are arranged along an orthogonal second axis, each optical fiber further including a fiber joined portion where the optical fiber is joined to at least one adjacent optical fiber, the fiber joined portions extending along the first axis and being arranged along the second axis. The method can further include arranging the fiber free portions along a third axis while the fiber joined portions remain arranged along the second axis, the third axis being orthogonal to each of the first axis and second axis.

In some aspects, the present disclosure provides a device for modifying a fiber optic ribbon. The device can include a plurality of optical fibers, each optical fiber including a fiber joined portion where the optical fiber is joined to an adjacent optical fiber and a fiber free portion where the fiber is disconnected from the adjacent optical fiber. The device can also include a first member adapted to receive the fiber joined portions of the optical fibers and a second member rotatable with respect to the first member and adapted to receive the fiber free portions of the optical fibers. Further, when the joined and fiber free portions of the optical fibers are received by the respective first and second members, the fiber free portions and the fiber joined portions can extend along a first axis and can be arranged along an orthogonal second axis, and when the second member is rotated with respect to the first member, the fiber free portions can extend along the first axis and can be arranged along a third axis orthogonal to each of the first and second axes.

BRIEF DESCRIPTION OF THE DRAWINGS

Throughout the specification reference is made to the appended drawings, where like reference numerals designate like elements, and wherein:

FIG. 13 illustrates a method for modifying a ribbon according to exemplary embodiments of the present disclosure.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying drawings that form a part hereof and which are shown by way of illustration. It is to be understood that other embodiments are contemplated and may be made without departing from the scope or spirit of the present disclosure. The following detailed description, therefore, is not to be taken in a limiting sense.

The optical cables used in many applications make use of fiber ribbons. These ribbons include a set of coated fibers joined together in a line. The individual fibers with their protective coatings can be 250 microns in diameter and the ribbons can have a fiber to fiber pitch P of 250 microns, 160 microns or any other suitable spacing. The 250 micron spacing has also been used in optical transceivers with a variety of designs spacing the active optical devices at the same 250 micron pitch.

Figure 1:
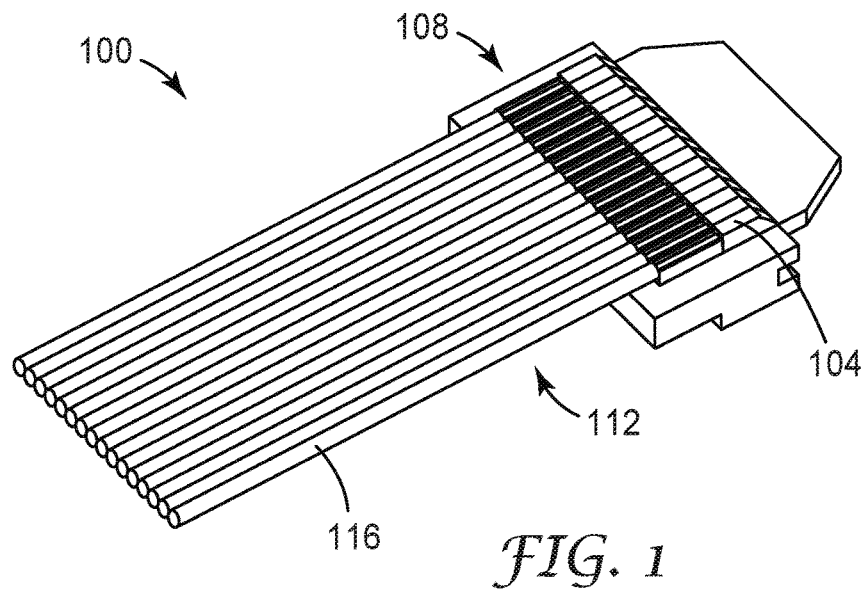
FIG. 1 is a schematic perspective view of a ribbon and a ferrule according to exemplary embodiments of the present disclosure.

FIG. 1 illustrates an optical system 100. The optical system 100 can include elements for the transmission of optical signals useful in data transmission and communication. The optical system 100 can include an optical ferrule, or ferrule, 104. The ferrule 104 can define an attachment area 108 where portions of a ribbon, or fiber optic ribbon, 112 attach to the ferrule 104 using adhesives, chemical attachments or mechanical attachment techniques known to those skilled in the art. The ribbon 112 includes one or more optical fibers 116. The optical fibers, or fibers, 116 can be arranged in parallel, or substantially in parallel, and further can be arranged linearly, or substantially linearly, as exemplarily shown in FIG. 1.

Figure 2:
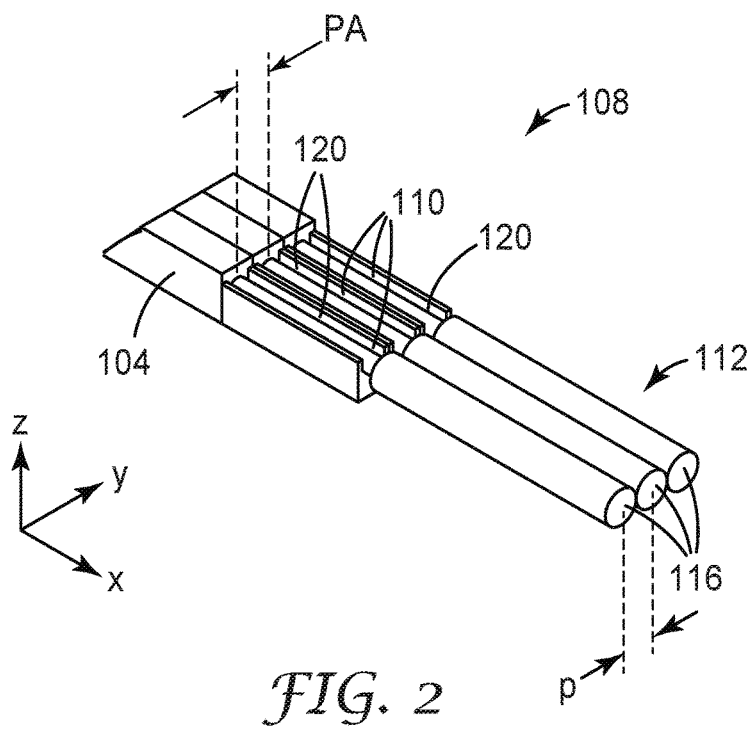
FIG. 2 is a schematic perspective view a portion of the ribbon and ferrule of FIG. 1.

FIG. 2 illustrates the attachment area 108 and individual optical fibers 116. The ribbon 112 can include a plurality of spaced-apart fibers 116, as exemplarily shown in FIG. 2, or can include fibers 116 adjacent other fibers 116, as exemplarily shown in FIG. 1. The attachment area 108 can include one or more attachment features 110, which can include one or more grooves 120, for receiving the fibers 116. In some embodiments, one groove 120 is spaced and sized to receive a portion of a fiber 116, as will be described further below.

Figure 3A:
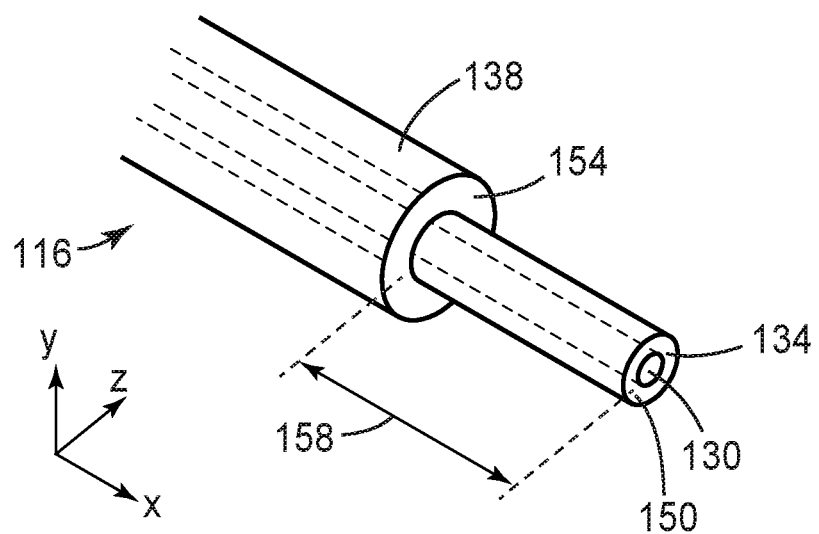
FIG. 3*a* is a schematic perspective view of an optical fiber according to exemplary embodiments of the present disclosure.

FIG. 3a illustrates an exemplary fiber 116. The fiber 116 can include a plurality of concentric layers, namely a core 130 at least partially surrounded by, or adjacent, a cladding 134. The cladding 134 can in turn be at least partially surrounded by, or adjacent, a buffer 138. In some embodiments, the buffer 138 includes a polymer material. A fiber free end 150 is illustrated, and can represent an end point of the fiber 116 along a first axis X. Similarly, a fiber buffer end 154 is also illustrated and can represent an end point of the buffer 138 along the first axis X. The buffer 138 can be stripped from the fiber 116 at the fiber buffer end 154, thus forming a fiber stripped section 158. The fiber stripped section 158 can thus extend from the fiber buffer end 154 to the fiber free end 150. Turning back to FIG. 2, it can be seen that for each of the illustrated fibers 116, some or all of the fiber stripped sections 158 can be received by the grooves 120.

Figure 3B:
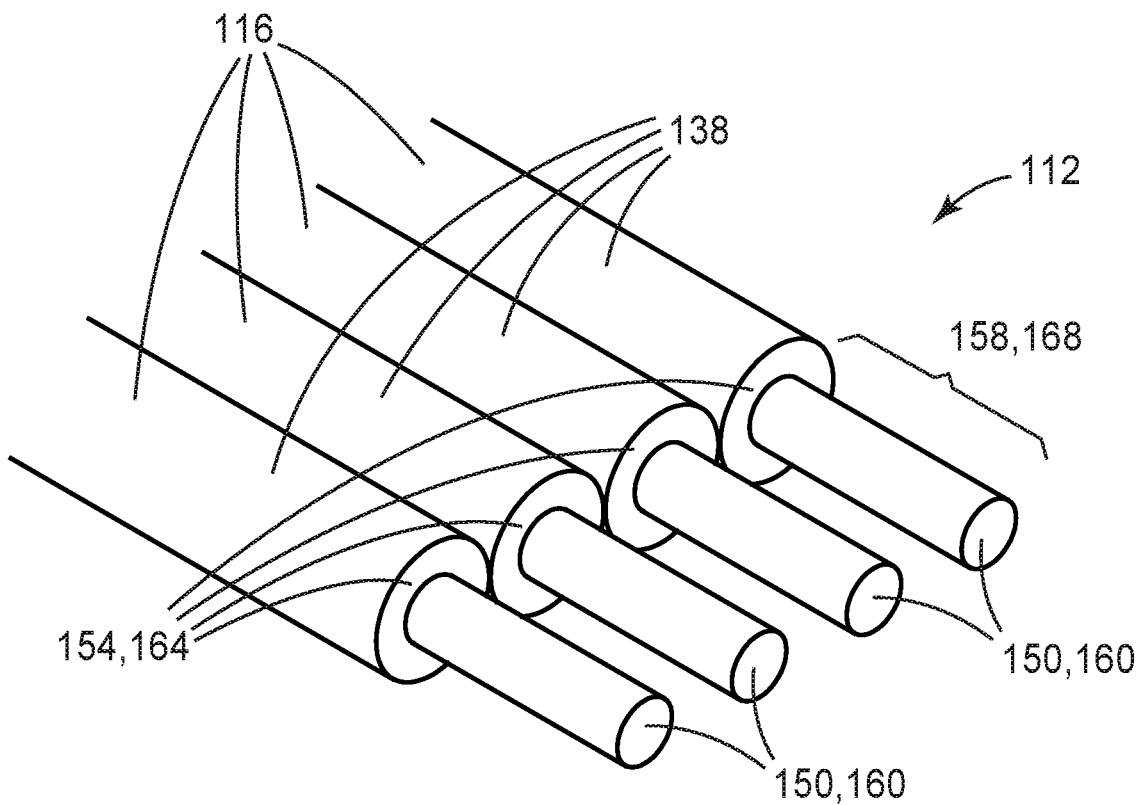
FIG. 3*b* is a schematic perspective view of a ribbon according to exemplary embodiments of the present disclosure.

FIG. 3b illustrates an exemplary ribbon 112 including a plurality of fibers 116. Each of the fibers 116 includes a fiber stripped section 158 extending from the fiber buffer end 154 to the fiber free end 150. The ribbon 112 can define a ribbon free end 160, corresponding to the fiber free ends 150 of the constituent fibers 116 of the ribbon 112. The ribbon 112 can also define a ribbon buffer end 164, corresponding to the fiber buffer ends 154 of the constituent fibers 116 of the ribbon 112. Similarly, the ribbon 112 can define a ribbon stripped section 168, corresponding to the fiber stripped sections 158 of the constituent fibers 116 of the ribbon 112.

Figure 3C:
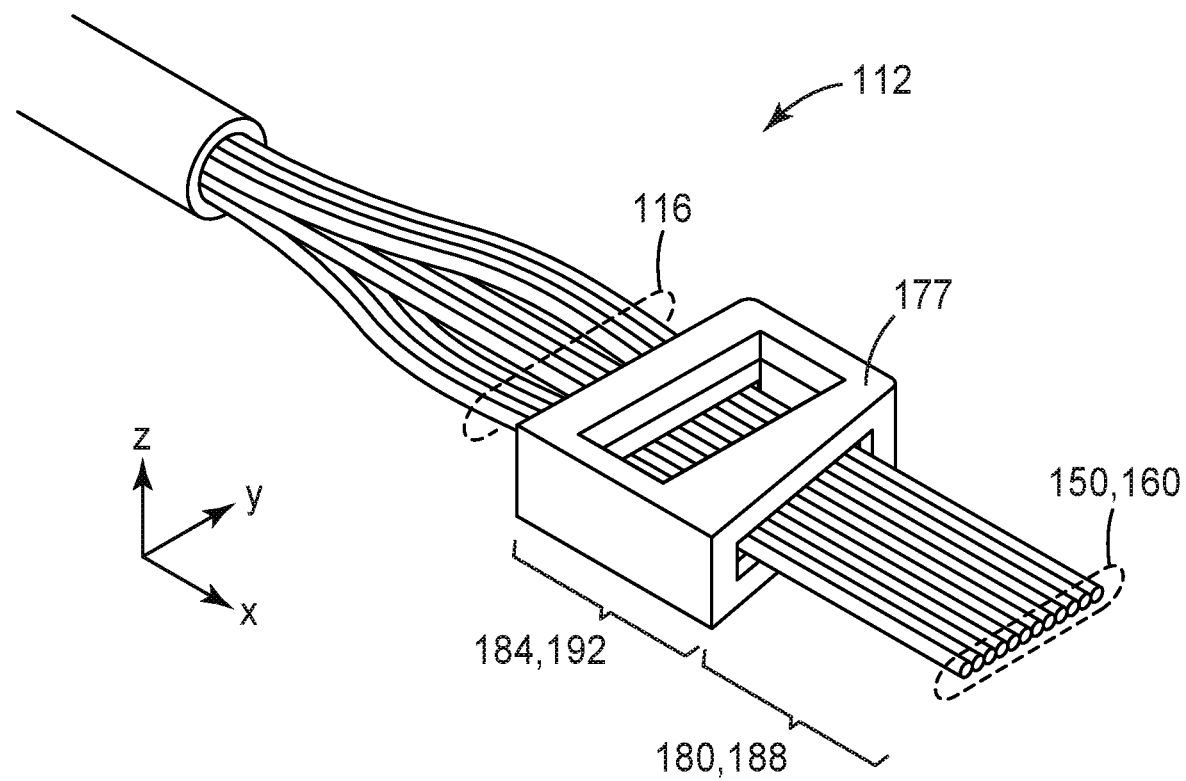
FIG. 3*c* is a schematic perspective view of a ribbon including a collet according to exemplary embodiments of the present disclosure.

FIG. 3c is a schematic perspective view of the ribbon 112 including a collet 177 according to exemplary embodiments of the present disclosure. In such an embodiment, portions of the fibers 116, which can all be free and/or disconnected from adjacent fibers 116, within the collet 177 can correspond to the fiber joined portions 184 and/or the ribbon joined portions 192, while fibers 116 portions away from and/or outside of the collet 177 can correspond to the fiber free portions 180 and/or the ribbon free portions 188. These portions will also be described below in further detail.

Figure 4A:
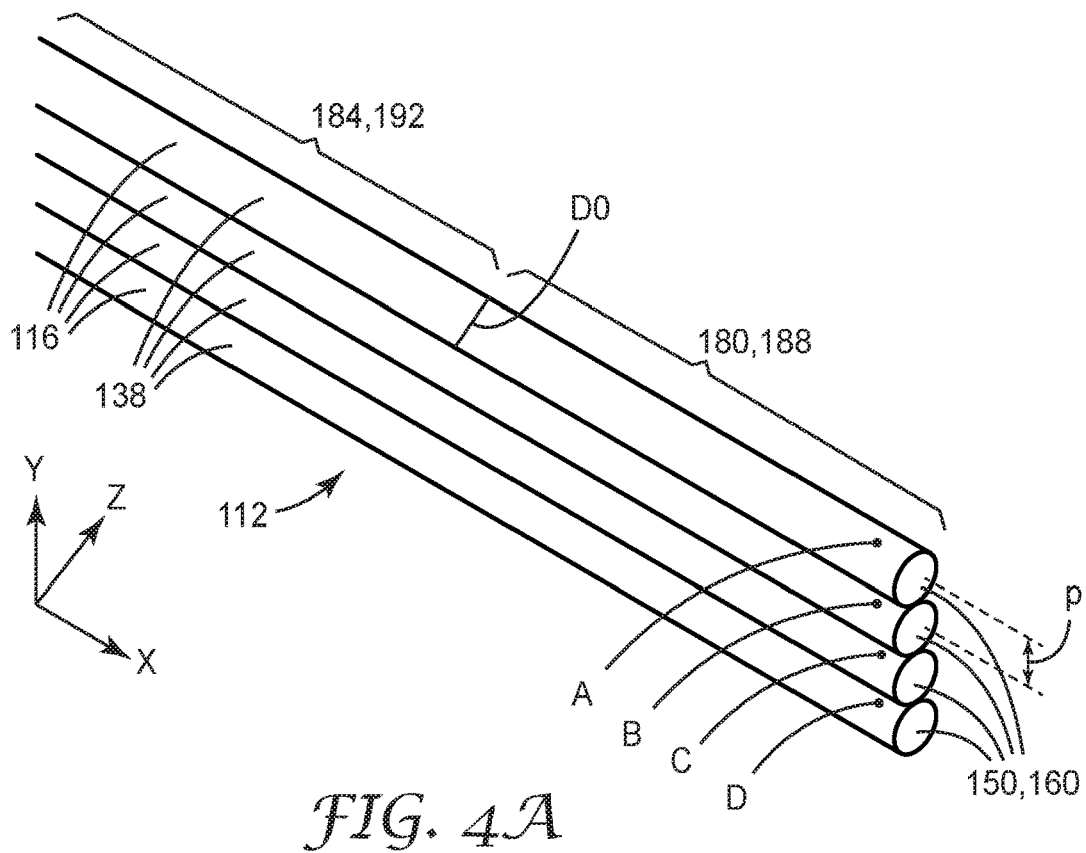
FIGS. 4*a*-4*d* are schematic perspective views illustrating a modification of a ribbon according to exemplary embodiments of the present disclosure.

FIGS. 4a-4d illustrate exemplary methods, configurations and articles of the fibers 116 and ribbon 112. FIG. 4a illustrates an exemplary ribbon 112 including a plurality of fibers 116. The ribbon 112 and fibers 116 extend substantially along the first axis X and are arranged substantially along a second axis Y. The axes X and Y can be orthogonal to one another. Also visible in FIG. 4a are fiber free portions 180 and fiber joined portions 184. The fiber free portion 180 can be a portion of a given fiber 116 where the fiber is disconnected from adjacent fibers 116. The fiber joined portion 184 can be a portion of a given fiber 116 where the fiber is joined to an adjacent fiber 116 by adhesives, polymers, mechanical bindings or any other joining technique known to one skilled in the art. The ribbon 112 can also define a ribbon free portion 188, corresponding to the fiber free portions 180 of the constituent fibers 116 of the ribbon 112. Similarly, the ribbon 112 can also define a ribbon joined portion 192 corresponding to the fiber joined portions 184 of the constituent fibers 116 of the ribbon 112.

Reference points, A, B, C and D are indicated on the four illustrated fibers 116 in FIG. 4a. It is noted that each of these reference points indicate a particular original angular orientation of each fiber 116 about the first axis X, such that a rotation of a fiber 116 about the X axis causes a corresponding rotation of the reference point A, B, C, D indicated on that particular fiber 116, and thus a change in the angular orientation of the particular fiber 116 about the first axis X.

Figure 4B:
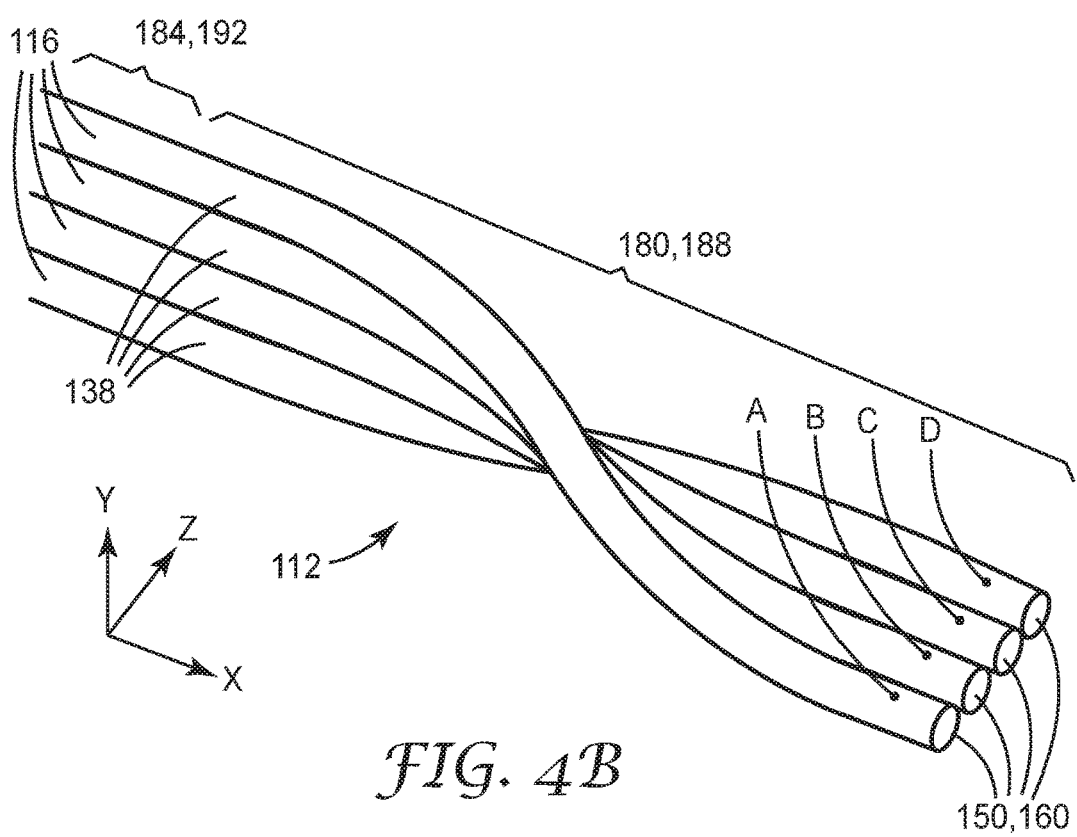

FIG. 4b illustrates the ribbon 112 and fibers 116 of FIG. 4a, but where the fiber free portions 180 have been arranged along a third axis Z. FIG. 4b illustrates the ribbon 112 and fibers 116 of FIG. 4a, but where the ribbon free portion 188 has been arranged along the third axis Z. The third axis Z can be orthogonal to each of the first and second axes X, Y. However, in some embodiments the fiber free portions 180 and/or the ribbon free portion 188 can be arranged along an axis different from the third axis Z, but still perpendicular to the first axis X.

Reference points, A, B, C and D are also indicated on the four illustrated fibers 116 in FIG. 4b. It is noted that these reference points indicate the same original angular orientations of each fiber 116 about the first axis X as those shown in FIG. 4a. Thus, the rearrangement of the fiber free portions 180 and/or the ribbon free portion 188 from the configuration shown in FIG. 4a (arranged along the second axis Y) to the configuration shown in FIG. 4b (arranged along the third axis Z) did not alter the angular orientation of the fibers 116 about the first axis X. It is to be understood that embodiments where the fiber free portions 180 and/or the ribbon free portion 188 are arranged along an axis different from the third axis Z, but still perpendicular to the first axis X, will similarly not alter the angular orientation of the fibers 116 about the first axis X. In some embodiments, the buffer 138 has a nominal diameter of D0, which can be substantially constant throughout the fiber free portion 180 and/or the fiber joined portion 184. In some embodiments, D0 is substantially equal to a pitch P of the fibers 116 of the ribbon 112.

Figure 4C:
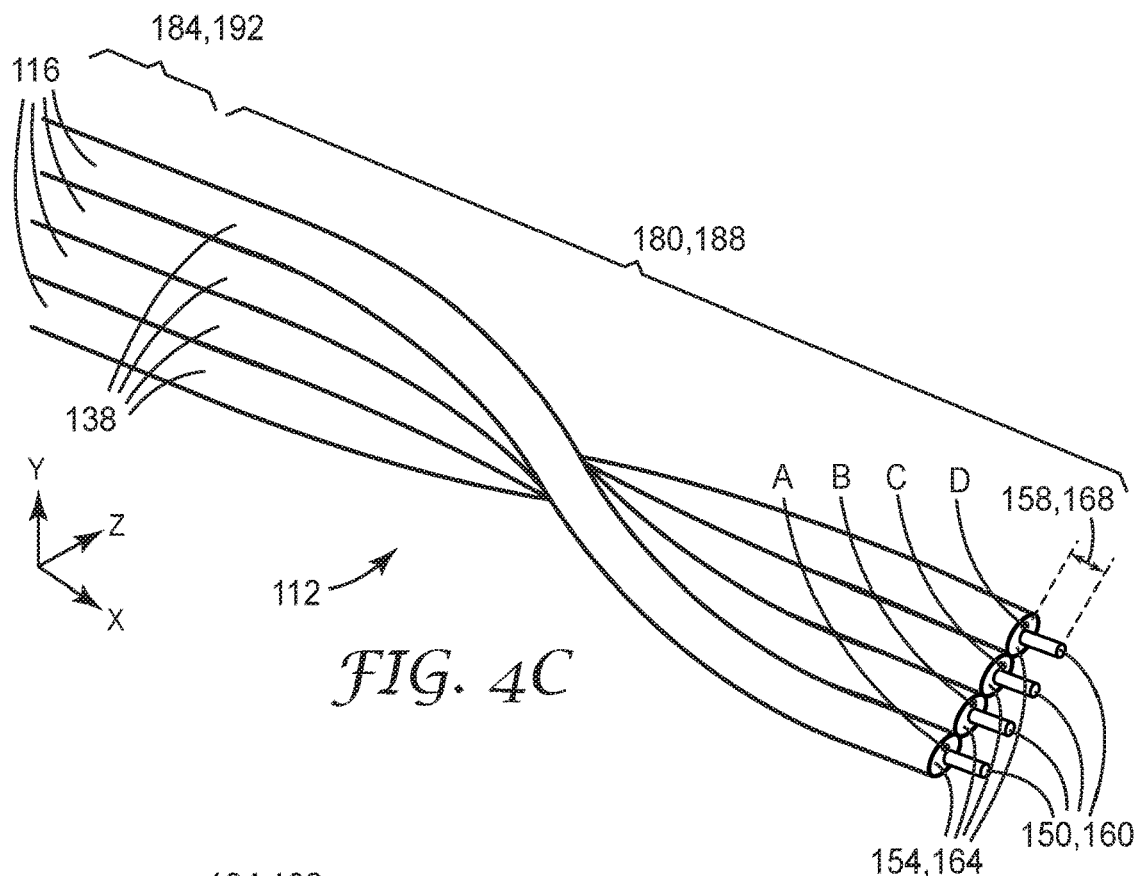

FIG. 4c illustrates an embodiment of the ribbon 112 and fibers 116, which can be the ribbon 112 and fibers 116 of FIGS. 4a and 4b, but where at least a portion of the fiber free portions 180 and ribbon free portion 188 have been stripped of the buffer 138. In some embodiments, portions of the fiber free portions 180 can be heated and/or cut such that the buffer 138 can be removed from the fiber 116. The removed buffer portion leaves the fiber buffer end 154, from which the remaining core 130 and cladding 134 of the fiber 116 extend until terminating at the fiber free end 150. The fiber 116 portion between the fiber buffer end 154 and the fiber free end 150 can define the fiber stripped section 158 and/or the ribbon stripped section 168.

When the buffer 138 is removed to form the fiber buffer end 154, the buffer 138 proximate the fiber buffer end 154 can become distorted due to the buffer 138 removal process.

Figure 4D:
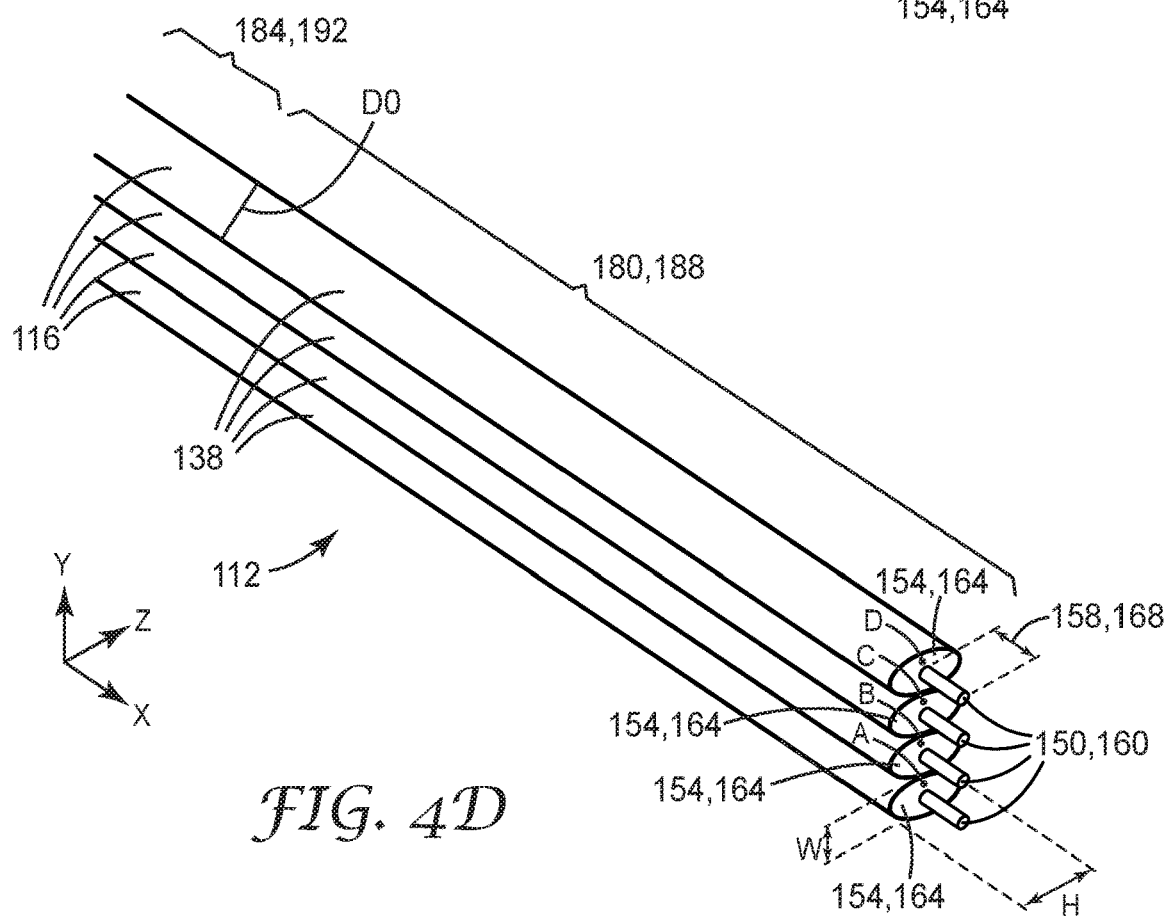

In some embodiments, as illustrated in FIG. 4c, the buffer 138 proximate the fiber buffer end 154 can become distorted and/or take on a non-circular cross section, a different cross section than buffer 138 portions located away from the fiber buffer end 154, a different cross section than buffer 138 portions located at the fiber joined portion 184, a different cross section than buffer 138 portions located at the ribbon joined portion 192 and/or a different cross section than buffer 138 portions prior to the buffer 138 being stripped (such as those shown in FIG. 4b). FIG. 4d exemplarily illustrates the distorted fiber buffer ends 154 and the fibers 116 once again arranged along the second Y axis following the distortions as described regarding FIG. 4c.

In some embodiments, the buffer 138 located at and/or proximate the fiber buffer end 154 has a height H, as measured along the third axis Z, greater than the nominal diameter D0. In some embodiments, the buffer 138 located at and/or proximate the fiber buffer end 154 has a width W as measured along the second axis Y less than the nominal diameter D0.

Figure 5:
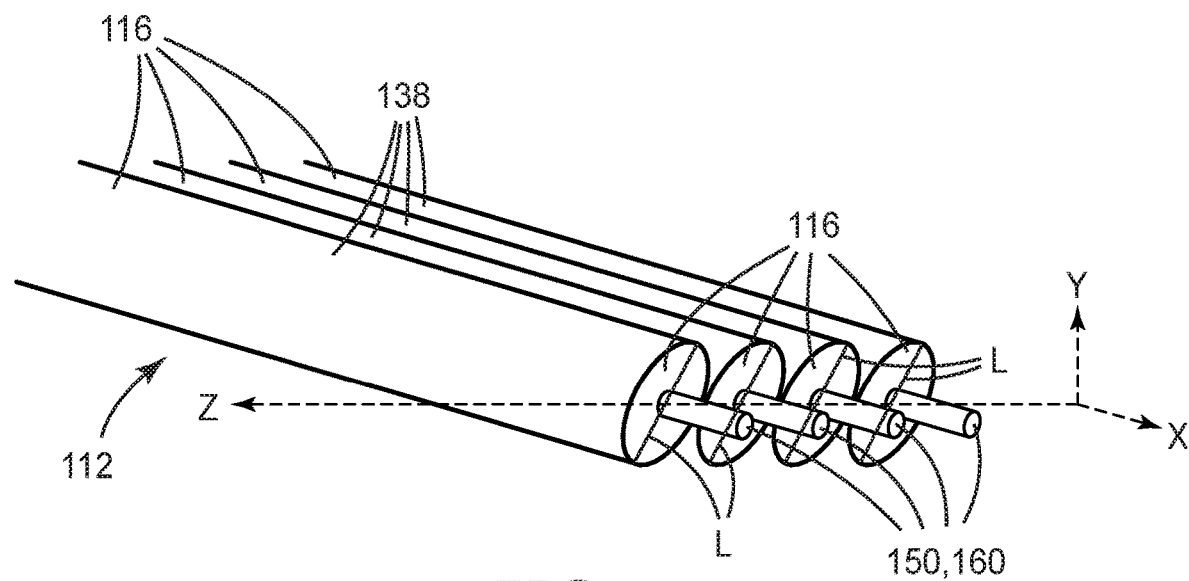
FIG. 5 is an exemplary schematic perspective view of a modified ribbon according to exemplary embodiments of the present disclosure.

FIG. 5 illustrates an embodiment of the fibers 116 following the stripping of a portion of the buffer 138 along the first axis X toward the fiber buffer end 154, where the fibers 116 are arranged along the third axis Z. In some embodiments, the buffer 138 located at and/or proximate the fiber buffer end 154 has a maximum lateral dimension L. L can be measured from one side of the buffer 138 to another side of the buffer 138 perpendicular to the first axis X. In some embodiments, the cross section of the buffer 138 located at and/or proximate the fiber buffer end 154 is non-circular and/or non-radially symmetric, and a maximum lateral dimension L of the buffer 138 located at and/or proximate the fiber buffer end 154 is not along the second axis Y and/or the third axis Z.

Figure 6:
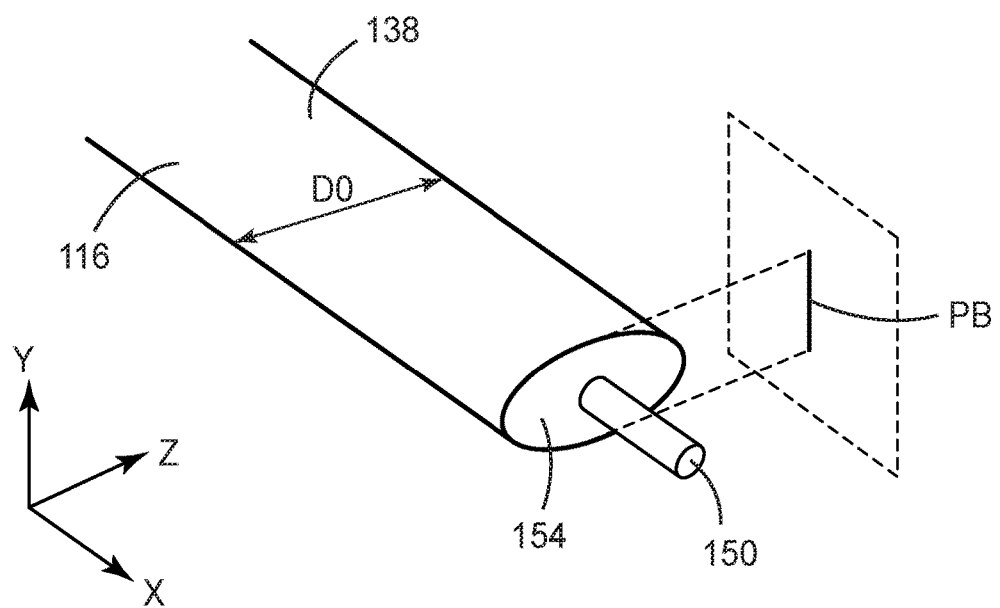
FIG. 6 is an exemplary schematic perspective view of a modified optical fiber according to exemplary embodiments of the present disclosure.

FIG. 6 illustrates one fiber of an embodiment of the fibers 116 following the stripping of a portion of the buffer 138. When the buffer 138 is removed to form the fiber buffer end 154, the buffer 138 proximate the fiber buffer end 154 can become distorted due to the buffer 138 removal process, as described. In some embodiments, as illustrated in FIG. 6, a length of projection PB along the second axis Y of the buffer 138 proximate and/or at the fiber buffer end 154 onto a plane parallel to the first and second axes X, Y is less than D0.

Returning to FIG. 2, the optical ferrule 104 and attachment area 108 are shown. The attachment area 108 can include one or more attachment features 110 extending along the first axis X and arranged along the second axis Y. A portion of the fiber stripped section 158 can be disposed at least partially within, and secured within, one of the attachment features 110 using adhesives, chemical attachments or mechanical attachment techniques known to those skilled in the art. The attachment features 110 can be disposed at a pitch PA of 250 microns, 160 microns or any other suitable distance.

Figure 7:
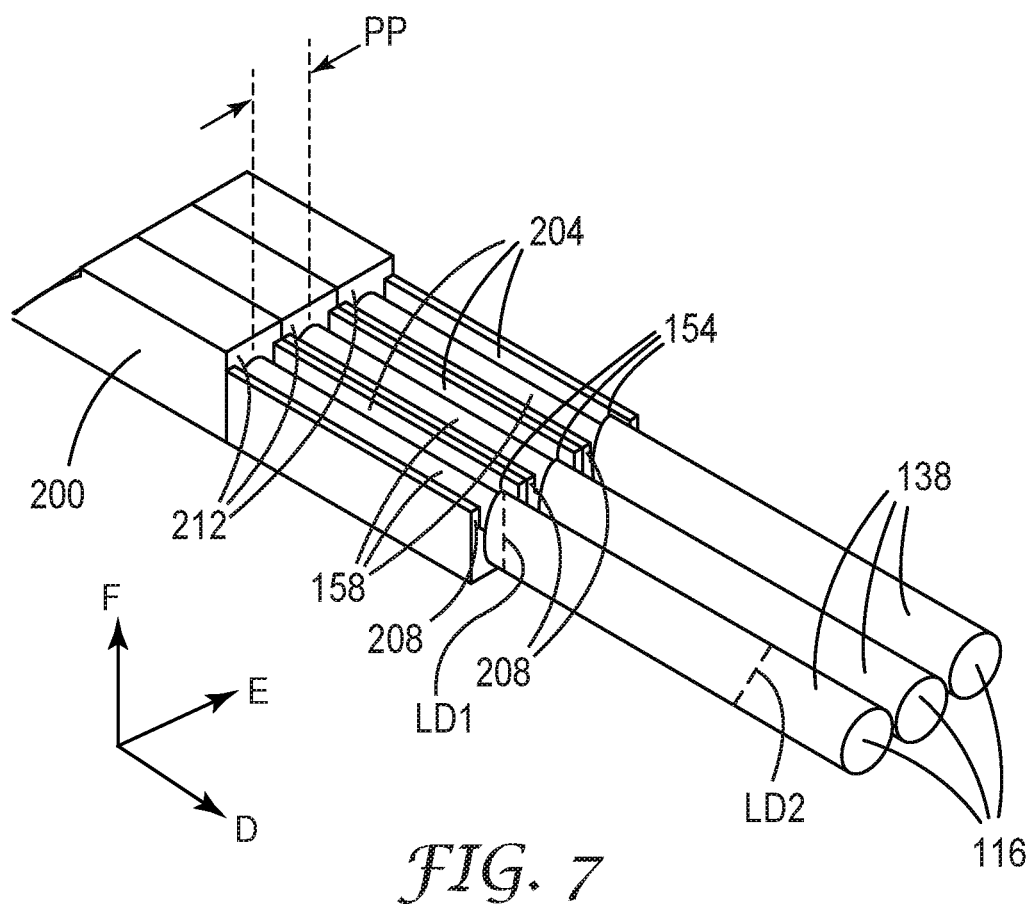
FIG. 7 is a schematic perspective view of a ribbon and ferrule according to exemplary embodiments of the present disclosure.
Figure 8:
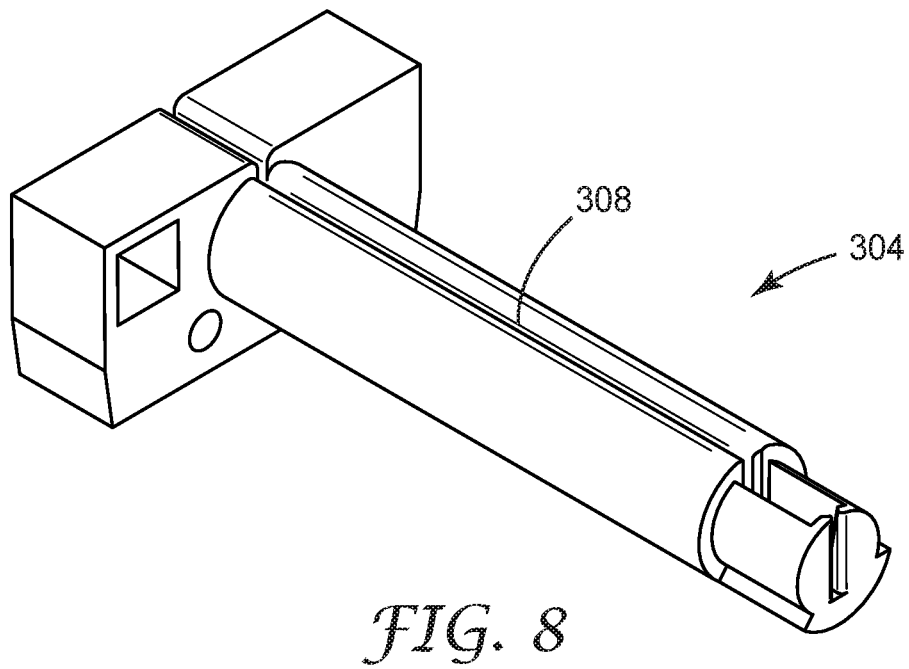
FIGS. 8-12 illustrate a device for modifying a ribbon according to exemplary embodiments of the present disclosure.
Figure 9:
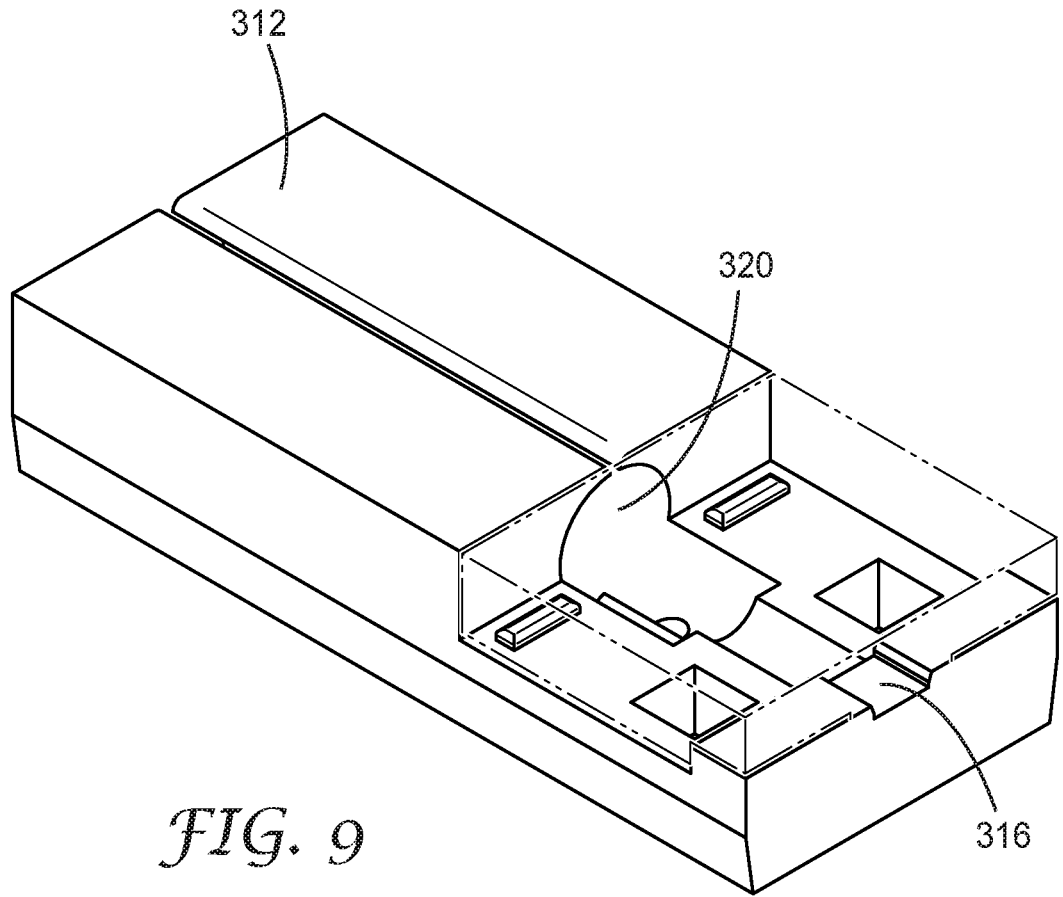
Figure 10:
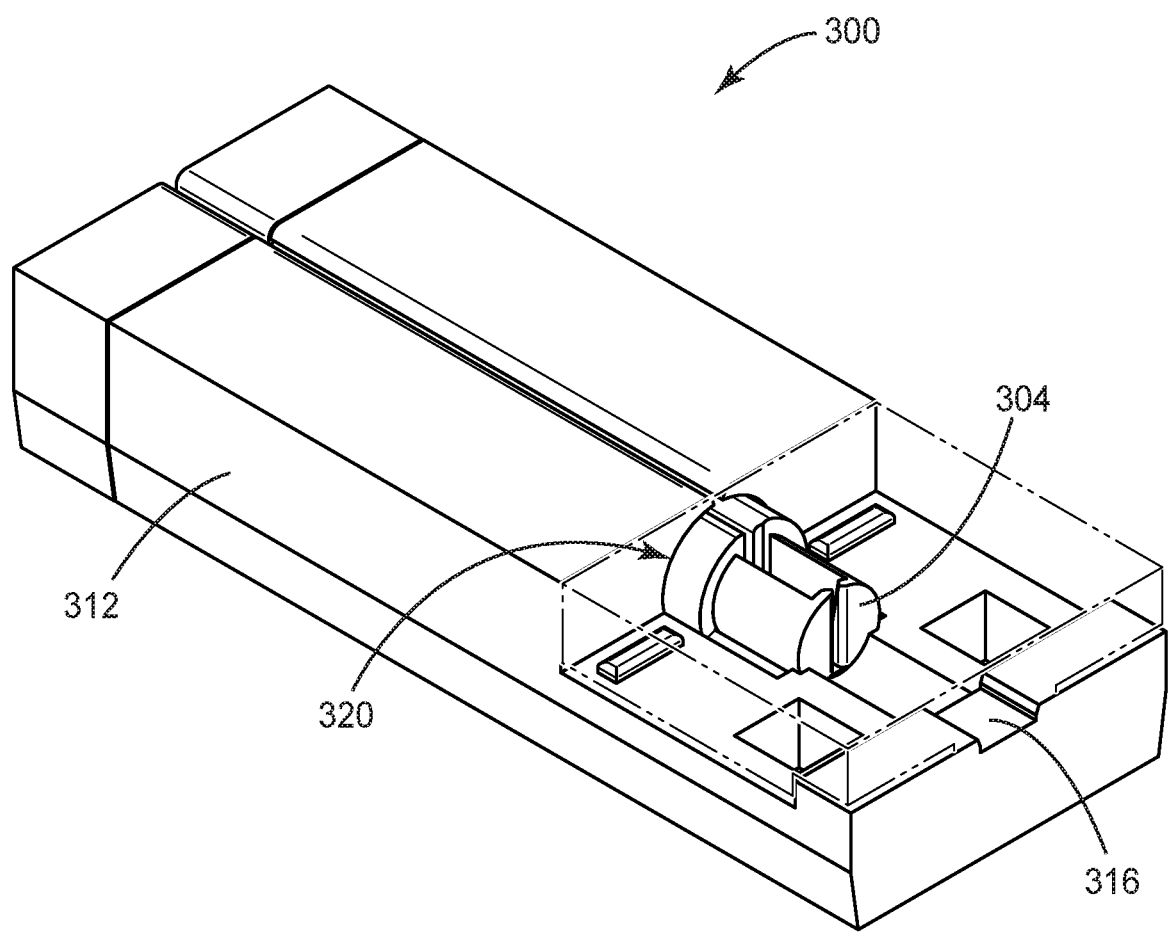

FIG. 7 illustrates a light coupling element 200 including a plurality of grooves 204, each groove 204 defining an opposed front end 208 and back end 212. The grooves 204 can extend along a first axis D and be arranged along a second axis E, perpendicular to D, at a pitch PP. Pitch PP can be 250 microns, 160 microns or any other suitable distance. A portion of the fiber stripped section 158 can be disposed at least partially within, and secured within, one of the grooves 204 by adhesives, chemical attachments or mechanical attachment techniques known to those skilled in the art. The fiber buffer end 154 can be disposed outside the groove 204 proximate the front end 208. In some embodiments, a maximum lateral dimension LD1 of the buffer 138 is greater than PP substantially at the fiber buffer end 154, a maximum lateral dimension LD2 of the buffer 138 is substantially equal to PP away from the fiber buffer end 154, and a maximum lateral dimension is not along the second axis E substantially at the fiber buffer end 154. LD1 and LD2 can be measured from one side of the buffer 138 to another side of the buffer 138. Further, although illustrated in a similar manner as the ferrule 104 of FIG. 2, FIG. 7 illustrates merely one exemplary embodiment of the light coupling element 200.

FIGS. 8-12 illustrate an exemplary embodiment of a device 300 for modifying an optical ribbon 112 including a plurality of fibers 116. As noted, each optical fiber 116 can include the fiber joined portion 184 and the fiber free portion 180. The device 300 can include a first member 304 (FIG. 8) defining a first channel 308, and a second member 312 (FIG. 9) defining a second channel 316. The first member 304 can be adapted to receive the fiber joined portions 184, and can also be adapted to secure and retain the fiber joined portions 184. The first member 304, and particularly the first channel 308, can retain, secure and/or receive the fiber joined portions 184 by mechanical, adhesive, chemical or any other commonly known joining techniques. In some embodiments, when the fiber joined portions 184 are received, secured and/or retained by the first member 304, specifically the first channel 308, the fiber joined portions 184 can move along with the first member 304 when the first member 304 rotates.

The second member 312 can be adapted to receive the fiber free portions 180, and can also be adapted to secure and retain the fiber free portions 180. The second member 312, and particularly the second channel 316, can retain, secure and/or receive the fiber free portions 180 by mechanical, adhesive, chemical or any other commonly known joining techniques. In some embodiments, when the fiber free portions 180 are received, secured and/or retained by the second member 312, specifically the second channel 316, the fiber free portions 180 can move along with the second member 312 and/or can remain retained by the second channel 316 when the second member 312 rotates.

Figure 11:
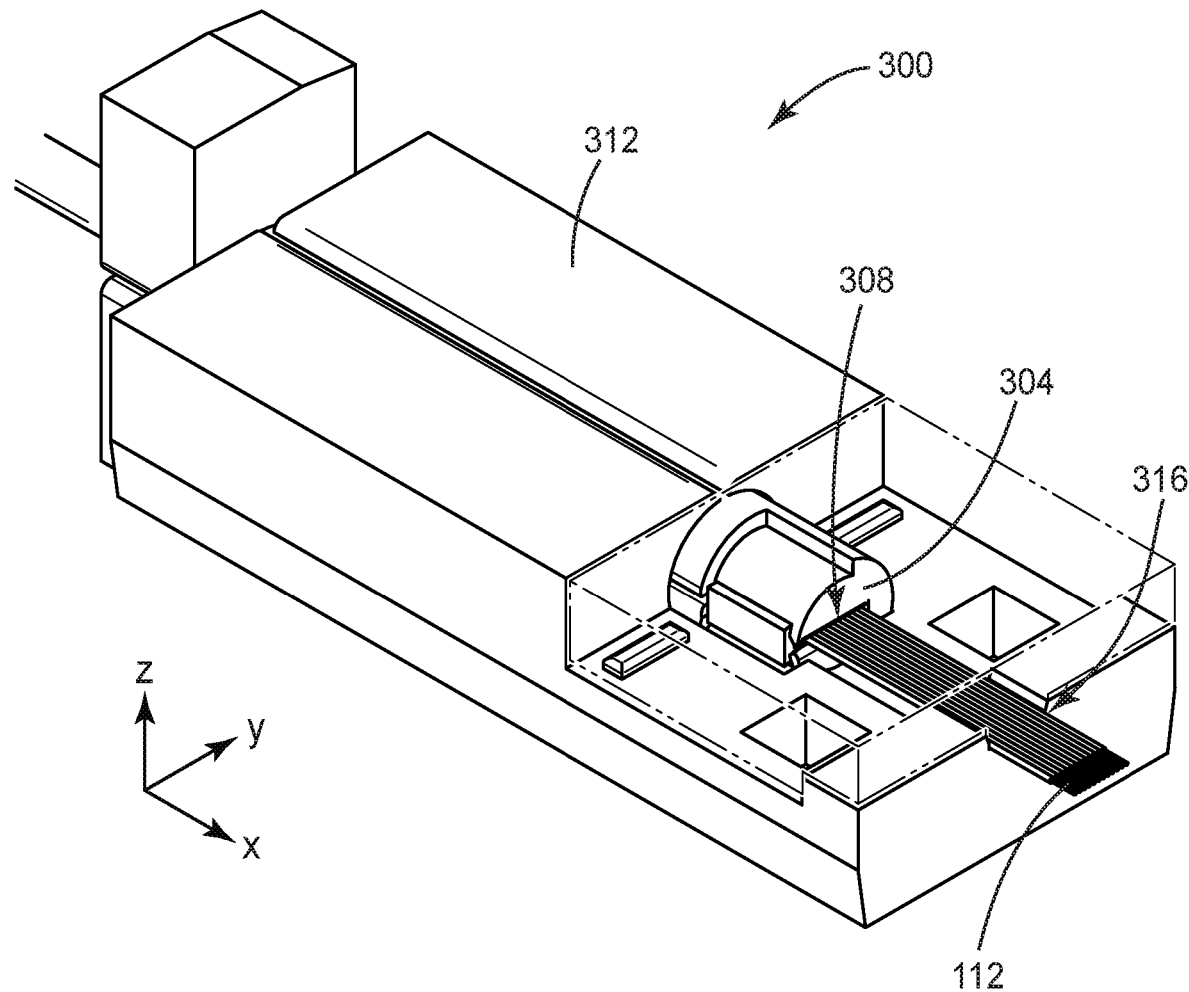

The second member 312 can also define a cavity 320 into which at least a portion of the first member 304 can be disposed. In some embodiments, a portion of the first member 304 is disposed within the cavity 320 such that the first member 304 can rotate within the cavity 320 relative to the second member 312. In some embodiments, the second channel 316 can receive, secure and/or retain the fiber free portions 180 and the first channel 308 can receive, secure and/or retain the fiber joined portions 184 while a portion of the first member 304 is disposed within the cavity 320, as best shown in FIG. 11.

Figure 12:
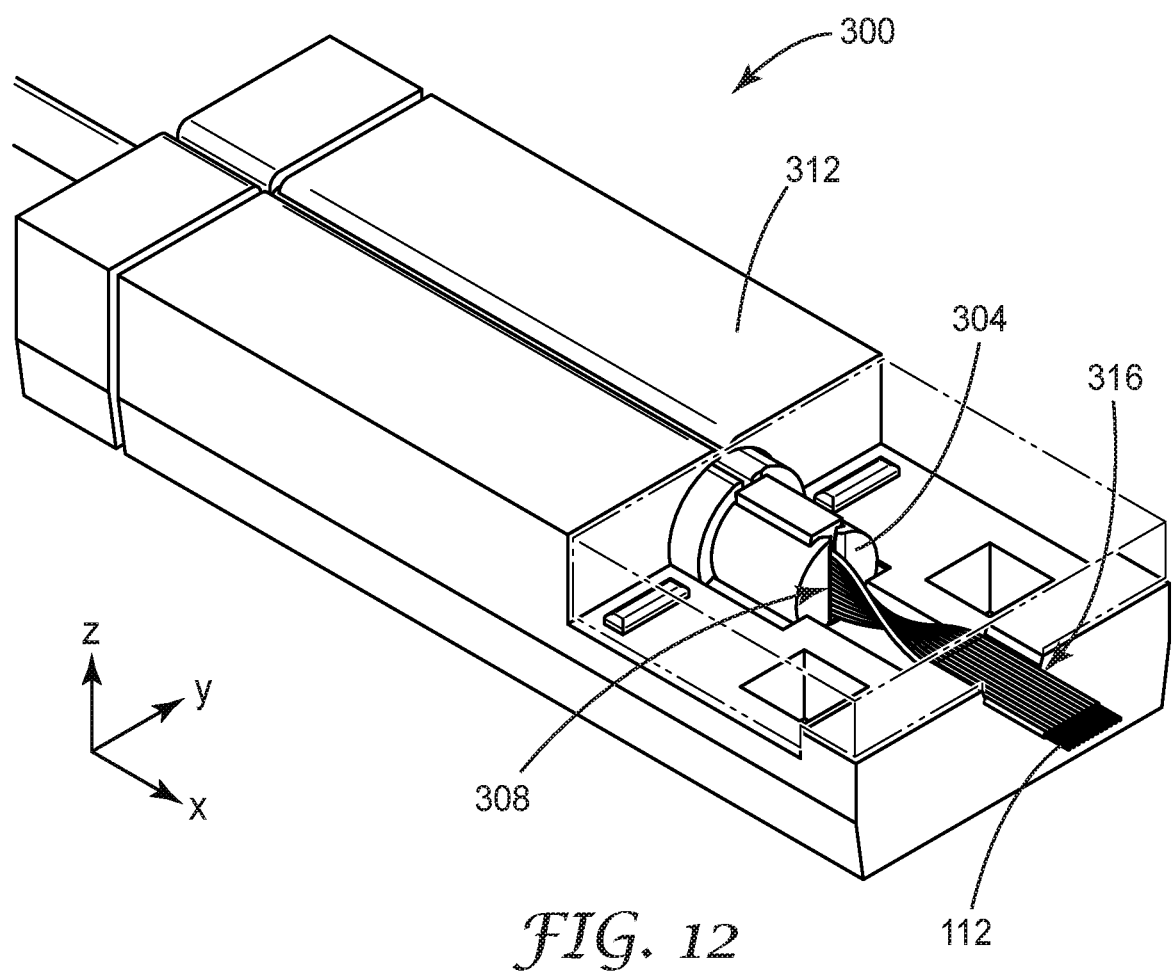

In some embodiments, the second member 312 is rotated with respect to the first member 304 while the fiber free portions 180 are received, secured and/or retained within the second channel 316 and while the fiber joined portions 184 are received, secured and/or retained within the first channel 308, as best shown in FIG. 12. In some examples, prior to such a rotation, the fiber free portions 180 extend along the first axis X and are arranged along the orthogonal second axis Y and, after such a rotation, the fiber free portions 180 extend along the first axis X and are arranged along the orthogonal third axis Z. In some examples, such a process can be illustrated by FIGS. 4a and 4b.

In some embodiments, the second member 312 is rotated with respect to the first member 304 while the fiber free portions 180 are received, secured and/or retained within the second channel 316 and while the fiber joined portions 184 are received, secured and/or retained within the first channel 308. In some examples, prior to such a rotation, the fiber free portions 180 extend along the first axis X and are arranged along the orthogonal second axis Y and each fiber free portion 180 has an original angular orientation about the first axis X and, after such a rotation, the fiber free portions 180 extend along the first axis X and are arranged along the orthogonal third axis Z and each fiber free portion 180 retains the original angular orientation about the first axis X. In some examples, such a process can be illustrated by FIGS. 4a, 4b and 4c.

A method 400 of modifying the fiber optic ribbon 112, in some embodiments, is disclosed. Such a method is exemplarily illustrated by FIG. 13. The method 400 can include the step 404 of providing the fiber optic ribbon 112 including a plurality of optical fibers 116, each optical fiber 116 can include a core 130 surrounded by a cladding 134 surrounded by a buffer 138, each optical fiber 116 can include a free portion 180 where the optical fiber 116 is disconnected from adjacent optical fibers 116 and the free portions 180 can extend along the first axis X and can be arranged along the orthogonal second axis Y, each optical fiber 116 can further include a joined portion 184 where the optical fiber 116 is joined to at least one adjacent optical fiber 116, the joined portions 184 can extend along the first axis X and can be arranged along the second axis Y 404. The method 400 can also include (step 408) arranging the free portions 180 along the third axis Z while the joined portions 184 remain arranged along the second axis Y and the third axis Z can be orthogonal to each of the first axis X and second axis Y. Further, the method 400 can also include (step 412) stripping at least some of the buffer 138 from at least one free portion 180 while the free portions 180 are arranged along the third axis Z and the joined portions 184 are arranged along the second axis Y.

Figure 14:
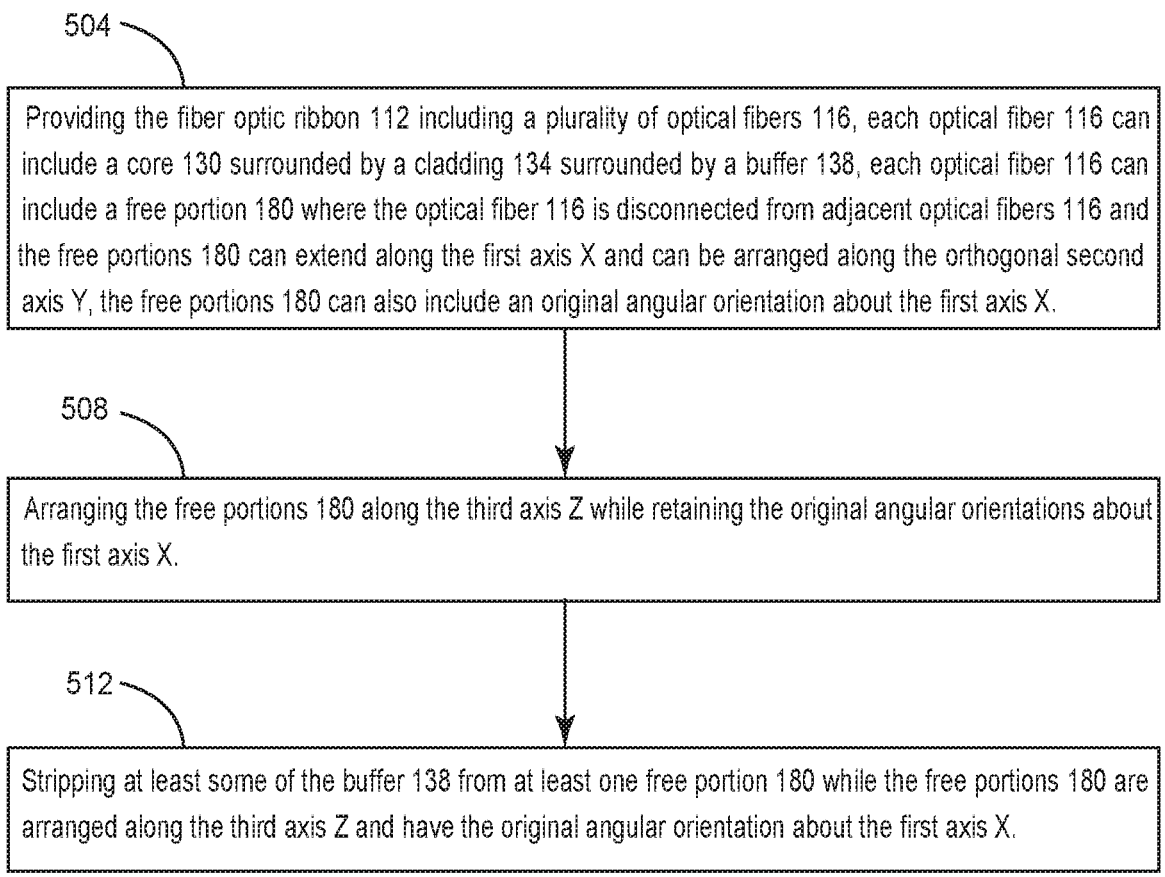
FIG. 14 illustrates a method for modifying a ribbon according to exemplary embodiments of the present disclosure.

A method 500 of modifying the fiber optic ribbon 112, in some embodiments, is disclosed. Such a method is exemplarily illustrated by FIG. 14. The method 500 can include the step 504 of providing the fiber optic ribbon 112 including a plurality of optical fibers 116, each optical fiber 116 can include a core 130 surrounded by a cladding 134 surrounded by a buffer 138, each optical fiber 116 can include a free portion 180 where the optical fiber 116 is disconnected from adjacent optical fibers 116 and the free portions 180 can extend along the first axis X and can be arranged along the orthogonal second axis Y, each of the free portions 180 can also include an original angular orientation about the first axis X. The method 500 can also include (step 508) arranging the free portions 180 along the third axis Z while retaining the original angular orientations about the first axis X 508. Finally, the method 500 can include (step 512) stripping at least some of the buffer 138 from at least one free portion 180 while the free portions 180 are arranged along the third axis Z and have the original angular orientation about the first axis X 512.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on", "connected to," "coupled with", or "in contact with", or "adjacent to" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as being "directly on," "directly connected to," "directly coupled with," or "directly in contact with" another element, there are no intervening elements, components or layers for example.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent embodiments can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A fiber optic ribbon, comprising:
a plurality of optical fibers extending along a first axis and arranged along an orthogonal second axis at a pitch P, each optical fiber comprising a core surrounded by a cladding surrounded by a buffer, the buffer having a nominal diameter D0 substantially equal to P, the buffer stripped between a buffer-end location on the fiber and a free end of the fiber to form a stripped section, the buffer distorted at the buffer-end location, such that at the buffer-end location, a width W of the buffer in the second axis is less than D0.

2. The fiber optic ribbon of claim 1, wherein a height H of the buffer in a third axis orthogonal to the first and second axes is greater than D0.

3. The fiber optic ribbon of claim 1, wherein at the buffer-end location, a maximum lateral dimension of the buffer is not along the second axis.

4. The fiber optic ribbon of claim 1, wherein the buffer includes a polymer.

5. The fiber optic ribbon of claim 1, wherein at least a portion of each stripped section is disposed within one of a plurality of attachment features of an optical ferrule.

6. The fiber optic ribbon of claim 5, wherein each stripped section is attached to one of the attachment features via an adhesive.

7. The fiber optic ribbon of claim 5, wherein the attachment features are arranged at a pitch of 250 microns.

8. A method of modifying a fiber optic ribbon, comprising:
providing the fiber optic ribbon including a plurality of optical fibers, each optical fiber including a core surrounded by a cladding surrounded by a buffer, each optical fiber including a fiber free portion where the optical fiber is disconnected from adjacent optical fibers and the fiber free portions extend along a first axis and are arranged along an orthogonal second axis, each optical fiber further including a fiber joined portion where the optical fiber is joined to at least one adjacent optical fiber, the fiber joined portions extending along the first axis and being arranged along the second axis; and
arranging the fiber free portions along a third axis while the fiber joined portions remain arranged along the second axis, the third axis being orthogonal to each of the first axis and second axis.

9. The method of claim 8, further including stripping at least some of the buffer from at least one fiber free portion while the fiber free portions are arranged along the third axis and the fiber joined portions are arranged along the second axis.

10. The method of claim 8, wherein each fiber free portion has an original angular orientation about an optical axis of the optical fiber, and each fiber free portion maintains the original angular orientation during and after the step of arranging the fiber free portions along a third axis while the fiber joined portions remain arranged along the second axis, the third axis being orthogonal to each of the first axis and second axis.

11. The method of claim 8, wherein the buffer includes a polymer.

12. A device for modifying a fiber optic ribbon including a plurality of optical fibers, each optical fiber comprising a fiber joined portion where the optical fiber is joined to an adjacent optical fiber and a fiber free portion where the fiber is disconnected from the adjacent optical fiber, the device comprising:
a first member adapted to receive the fiber joined portions of the optical fibers; and
a second member rotatable with respect to the first member and adapted to receive the fiber free portions of the optical fibers;
wherein when the joined and fiber free portions of the optical fibers are received by the respective first and second members, the fiber free portions and the fiber joined portions extend along a first axis and are arranged along an orthogonal second axis, and when the second member is rotated with respect to the first member, the fiber free portions extend along the first axis and are arranged along a third axis orthogonal to each of the first and second axes.

13. The device of claim 12, wherein when the joined and fiber free portions of the optical fibers are received by the respective first and second members, the fiber free portions and the fiber joined portions have an original angular orientation about the first axis, and when the second member is rotated with respect to the first member, the fiber free portions retain the original angular orientation.

14. The device of claim 12, wherein a portion of the first member is disposed within a cavity of the second member when the second member rotates relative to the first member.

15. The device of claim 12, wherein the fiber joined portions are received in a first channel of the first member and the fiber free portions are received in a second channel of the second member when the first and second members are relatively rotated.

* * * * *

UNITED STATES PATENT AND TRADEMARK OFFICE
CERTIFICATE OF CORRECTION

PATENT NO. : 12,164,164 B2
APPLICATION NO. : 17/637680
DATED : December 10, 2024
INVENTOR(S) : Michael A Haase et al.

Page 1 of 1

It is certified that error appears in the above-identified patent and that said Letters Patent is hereby corrected as shown below:

In the Claims

<u>Column 8</u>
Line 54, In Claim 1, delete "diameter DO" and insert -- diameter D0 --, therefor.

Signed and Sealed this
Twenty-ninth Day of April, 2025

Coke Morgan Stewart
*Acting Director of the United States Patent and Trademark Office*